United States Patent [19]

Daugherty et al.

[11] 3,821,220
[45] June 28, 1974

[54] REDUCING HYDROGEN CYANIDE LEVELS IN THE FORMATION OF CYANOALKYLAMINO SUBSTITUTED TRIAZINES

[75] Inventors: Hiram G. Daugherty; Harvey G. Little, both of Jackson, Ala.

[73] Assignee: Ciba-Geigy Corporation, Ardsley, N.Y.

[22] Filed: Jan. 4, 1972

[21] Appl. No.: 215,435

[52] U.S. Cl................. 260/249.6, 71/93, 260/249.8
[51] Int. Cl. ...................... C07d 55/20, C07d 55/22
[58] Field of Search...................... 260/249.6, 249.8

[56] References Cited
UNITED STATES PATENTS
3,505,325    4/1970    Schwarze..................... 260/249.6 X Primary Examiner—John M. Ford

[57] ABSTRACT

Hydrogen cyanide present with cyanoalkylamino substituted triazines is reacted with an agent which serves to reduce this HCN concentration. Examples of suitable agents are formaldehyde, sodium hypochlorite and hydrogen peroxide.

3 Claims, No Drawings

REDUCING HYDROGEN CYANIDE LEVELS IN THE FORMATION OF CYANOALKYLAMINO SUBSTITUTED TRIAZINES

This invention is directed to a process of making cyanoalkylamino substituted triazines which are useful as herbicides and for plant growth regulation.

More specifically the present method is considered to be an improvement in the process of making cyanoalkylamino substituted triazines compounds of the formula:

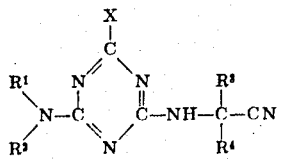

wherein X is selected from the group consisting of halogen, lower alkoxy, lower alkyl mercapto,

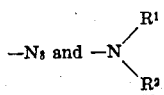

$R^1$ and $R^2$ being hydrogen, lower alkyl, lower alkenyl, substituted lower alkyl or substituted lower alkenyl in which latter two groups the substituents are —OH, —OR, —SR or —CN, R being lower alkyl, and wherein one of $R^3$ and $R^4$ is alkyl or alkenyl having from 1 to 8 carbon atoms and the other is hydrogen, alkyl or alkenyl having from 1 to 8 carbon atoms, and wherein $R^3$ and $R^4$ together with the adjoining carbon atom may form a 5 to 7 member cycloalkyl ring.

These compounds which have plant growth regulating properties are disclosed in Schwarze, U.S. Pat. No. 3,505,325 issued Apr. 7, 1970. Since the present process is considered to be an improvement over the technique disclosed in this patent, the disclosure of this teaching is incorporated by reference herein.

The basic reaction employed in the present process involves the use of α-amino nitrile of the formula:

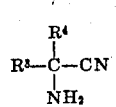

wherein $R^3$ and $R^4$ have been previously defined and one of $R^3$ or $R^4$ is alkyl or alkenyl having from 1 to 8 carbon atoms and the other is hydrogen, alkyl or alkenyl having from 1 to 8 carbon atoms, and wherein $R^3$ and $R^4$ together with the adjoining carbon atoms may form a 5 to 7 member cycloalkyl ring.

A most desirable class of compounds is of the formula:

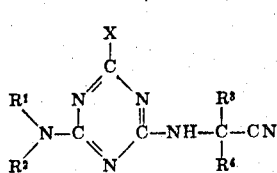

wherein X is a halogen atom, preferably, chlorine, lower alkoxy, lower alkyl mercapto,

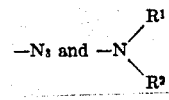

each of $R^1$ and $R^2$ taken individually is hydrogen or lower alkyl or alkenyl (straight or branched chained) or lower alkyl or alkenyl substituted with —OH, —OR, —SR or —CN, R being lower alkyl, each of $R^3$ and $R^4$ taken individually is alkyl or alkenyl or aralkyl groups of 1 to 8 carbon atoms and taken together form a 5 to 7 membered ring, in addition one of $R^3$ and $R^4$ can be hydrogen.

There are many satisfactory methods for making the desired compound of formula I. One suitable technique involves the reaction of the α-amino nitrile with cyanuric chloride. The formed product may be reacted with ammonia or an amine of the formula $NHR_1R_2$ to form the desired compound. Suitably aqueous sodium hydroxide is employed in both the first and second reactions.

However, as discussed in U.S. Pat. No. 3,505,325, it is possible to utilize an alkyl mercapto derivative in place of the chloro substituted triazine and react the α-amino nitrile in the presence of an acid binding agent followed by reaction with an amine. Alternatively the amino group may be introduced into the triazine ring prior to the alkyl mercapto group.

Additional alternative techniques for the production and synthesis of the herbicide are discussed in U.S. Pat. No. 3,505,325.

In the present disclosure, the compound of formula I is formed by utilizing an α-amino nitrile reactant of formula II. No assertions are made to the novelty of the reaction to produce the compound of formula I employing specific reactions. In the present context a precursor composition is defined to denote the necessary components which in addition to the α-amino nitrile of formula II will produce the defined plant regulating compound of formula I. It is understood in the present context that the components of the precursor composition will be presented in proper order to produce the desired reaction to making the formula I compound.

The α-amino nitriles used in the present process are produced by well known methods including those described in U.S. Pat. No. 3,505,325. The employed α-amino nitriles are unstable and have a great tendency to decompose. A product present in conjunction with the α-amino nitrile has been found to be hydrogen cyanide. In reaction of α-amino nitrile with the compound I precursor the hydrogen cyanide remains for the most part with the reaction product. This presence of HCN is highly undesirable due to the toxicity hazard. Additionally solvents such as methyl ethyl ketone or acetone desirably are employed in the reaction process. Recycling of these solvents causes an increase in hydrogen cyanide concentration. Release in any significant quantity of the HCN to the atmosphere is most undesirable.

It is a primary purpose of the present invention to minimize the hydrogen cyanide content present in the formation of cyanoalkylamino substituted triazines. The present improvement described causes a reduction of hydrogen cyanide in the cyanoalkylamino substituted triazines of formula I.

Due to the toxicity hazard of hydrogen cyanide, it is most desirable that the quantity of HCN be reduced in the final product. The hydrogen cyanide will be introduced and will be present due to the use of the α-amino nitrile.

It has been discovered that the hydrogen cyanide level in the α-amino nitrile can be considered to be at an equilibrium level. To illustrate this effect, reference will be made to a preferred cyanoalkyl amino substituted triazine, namely, 2-chloro-4-methylamino-6-(1-cyano-1-methyl-ethyl)-amino triazine.

A desired manner of making this latter compound is by reacting α-aminoisobutyronitrile with cyanuric chloride followed by reaction with monoethyl amine. In both the first and second steps a solvent such as methyl ethyl ketone and a base as sodium hydroxide are desirably employed.

Even with use of an α-aminoisobutyronitrile in highly pure concentration such as above 95% by weight, hydrogen cyanide has been found to be present in a level of about 0.1% by weight. When dilution of the α-aminoisobutyronitrile takes place such as to 80% by weight, an immediate proportional decrease of the hydrogen cyanide concentration takes place. However, in a relatively short period of time, the hydrogen cyanide level increases steadily. After a time period of several hours, this level was found to stabilize at about 0.9%.

In the present process it is critical that a reduction of the hydrogen cyanide concentration take place after the α-amino nitrile has reacted with a component of the compound I precursor composition. Attempts to significantly reduce the hydrogen cyanide concentration present with the α-amino nitrile prior to reaction of the α-amino nitrile did not provide satisfactory results. Due to an equilibrium level of HCN, agent to react with the hydrogen cyanide prior to the reaction of the α-amino nitrile is not practical. Desirably to minimize product degradation, the agent will not be added until formation of the formula I compound. The equilibrium content of the HCN with the α-amino nitrile is considered to preclude effective elimination. Additionally use of a HCN reactant prior to use of the α-amino nitrile in the desired reaction can serve to decrease product quality. Lowering of product quality will occur when the HCN reactant enters into reaction with a constituent of the compound I precursor composition.

The hydrogen cyanide reactant most desirably is added after formation of the cyanoalkylamino substituted triazine encompassed within the scope of formula I. However it is within the scope of this disclosure to employ this reactant after the use of the α-amino nitrile but prior to formation of the final product.

The present procedure utilizes an agent which will react with hydrogen cyanide such as by addition or oxidation. Elimination or at least a significant reduction of the HCN content serves to minimize the toxicity hazard. Some product degradation of the cyanoalkylamino substituted triazine may take place due to use of the HCN reactant. However by proper control of the amount of this employed agent, the overall degradation effect may be minimized.

Hydrogen cyanide reactants will include:

Barium permanganate
t-Butyl chromate
t-Butyl hypochlorite
t-Butyl hydroperoxide
m Chloro perbenzoic acid
Chromic acid
Chromic anhydride
Formaldehyde
Hydrogen peroxide
Nickel peroxide
Nitric acid
Nitrogen oxide (s)
Nitrosyl chloride
Nitrous acid
Ozone
Peracetic acid
Perbenzoic acid
Potassium periodate
Petrifluoroacetic acid
Potassium dichromate
Potassium ferricyanide
Potassium hypochlorite
Potassium permanganate
Potassium peroxymonosulfate
Potassium persulfate
Sodium dichromate
Sodium hypobromite
Sodium hypochlorite
Sodium nitrite
Sodium periodate
Sodium persulfate The amount of the hydrogen cyanide reactant present will be determined by the amount of hydrogen cyanide present as well as the tendency of the reactant to effect product quality. Since the hydrogen cyanide will ordinarily be present in trace quantities measurable in parts per million, the agent which reacts with the HCN will be added in minor concentrations. It has been found that oxidizing agents such as peroxides can be tolerated in a large excess without causing any significant reduction in product quality. As a practical matter the level of cyanide reactant agent will present at a mole ratio of less than 50 to 1. However in contrast to use of a peroxide such as hydrogen peroxide, an agent such as formaldehyde will cause an undesirable degree of product degradation if used in excessive quantities. This latter agent forms an addition product with the hydrogen cyanide.

As a practical matter generally no more than 10 moles of formaldehyde will be employed per mole of hydrogen cyanide. A desirable range is considered to be a ratio of between 5:1 and 1:1 of formaldehyde to hydrogen cyanide.

To further illustrate the innovative aspects of the present invention the following examples are provided:

EXAMPLE I

Initially α-aminoisobutyronitrile was produced utilizing the following procedure. A jacketed 50 gal. stainless steel vessel equipped with an agitator, a temperature indicator and a sparge tube was used. 143 lbs. of acetone cyanohydrin of 99% assay was added with cooling to 5°C. Over approximately a 3 hr. duration employing agitation, 39.3 lbs. of ammonia (40% excess) from a pressurized cylinder was added in gaseous form through the sparge tube. A temperature of 5° to 10°C was maintained while keeping the vessel sealed to prevent the escape of ammonia. After complete addition of the ammonia the temperature was allowed to rise 20°–25°C and this temperature was maintained for a total reaction time of 8 hrs. including the time of addition. At the end of this duration the excess ammonia was stripped off from the reaction mass by applying 20–25 in. Hg. vacuum to obtain a level less than 1% ammonia. Thereafter this α-aminoisobutyronitrile was stored at 0° to 5°C in a system completely closed except for a vent equipped with a vent condenser.

Thereafter into a separate 300 gal. stainless steel jacketed reactor equipped with a temperature and condenser 646 lbs. of methyl ethyl ketone (88%) was added and cooled to 0°. 245 lbs. of ice and 185 lbs. of cyanuric chloride were added. 86.9 lbs. of α-aminoisobutyronitrile (100%) as an aqueous solution within an approximate purity of 78% was introduced. The temperature rose to +10°C by controlling the brine on the steel jacket. 80.2 lbs. of the 50% sodium hydroxide over a 20 min. period was added and the temperature rose to 20°C. 64.9 lbs. of monoethylamine (70%) over a 25 min. period was added and the temperature was allowed to rise to about 30°C. No cooling was applied to this step or in the following step where 80.9 lbs. of 50% sodium hydroxide was added. The temperature finally reached about 50°C. The hydrogen cyanide concentration was measured and found to be 1250 ppm. Thereafter the methyl ethyl ketone was stripped off the product was filtered and washed in a rotary vacuum filter and dried on a rotary dryer.

EXAMPLE II

The procedure of Example I was followed except prior to the measurement of the hydrogen cyanide concentration, 26.7 lbs. of 37% formaldehyde solution was added. Measurement of the HCN concentration gave a level of 1 ppm.

While the invention has been described with particular reference to specific embodiments, it is to be understood that it is not to be limited thereto but is to be construed rather broadly within the scope and extent of the appended claims.

What is claimed is:

1. In a method for producing cyanoalkylamino substituted triazines of the formula:

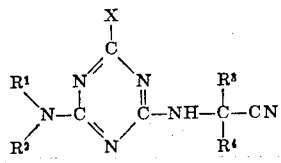

wherein X is selected from the group consisting of halogen, lower alkoxy, lower mercapto,

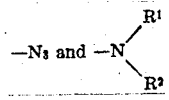

$R_1$ and $R_2$ being hydrogen, lower alkyl, lower alkenyl, substituted lower alkyl or substituted lower alkenyl in which latter two groups the substituents are —OH, —OR, —SR or —CN, R being lower alkyl, and wherein one of $R_3$ and $R_4$ is alkyl or alkenyl having from 1 to 8 carbon atoms and the other is hydrogen, alkyl or alkenyl having 1 to 8 carbon atoms, and wherein $R_3$ and $R_4$ together with the adjoining carbon atom may form a 5 to 7 member cycloalkyl ring, involving reaction of a halo-s-triazine with an α-amino nitrile of the formula:

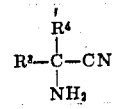

wherein said α-amino nitrile component contains hydrogen cyanide, the improvement comprising adding after reaction of said α-amino nitrile with said halo-s-triazine an agent selected from the group consisting of barium permanganate, t-butyl chromate, t-butyl hypochlorite, t-butyl hydroperoxide, m chloro perbenzoic acid, chromic acid, chromic anhydride, formaldehyde, hydrogen peroxide, nickel peroxide, nitric acid, nitrogen oxide (s), nitrosyl chloride, nitrous acid, ozone, peracetic acid, perbenzoic acid, potassium periodate, petrifluoroacetic acid, potassium dichromate, potassium ferricyanide, potassium hypochlorite, potassium permanganate, potassium peroxymonosulfate, potassium persulfate, sodium dichromate, sodium hypobromite, sodium hypochlorite, sodium nitrite, sodium periodate, sodium persulfate that will react with hydrogen cyanide to reduce the concentration of the hydrogen cyanide in said cyanoalkylamino substitued triazine.

2. The method of claim 1 wherein said agent is added after formation of said cyanoalkylamino substituted triazine.

3. The method of claim 2 wherein said agent is selected from the group consisting of formaldehyde, sodium hypochlorite or hydrogen peroxide.

* * * * *